(12) United States Patent
Sinha et al.

(10) Patent No.: US 11,663,497 B2
(45) Date of Patent: May 30, 2023

(54) FACILITATING CHANGES TO ONLINE COMPUTING ENVIRONMENT BY ASSESSING IMPACTS OF ACTIONS USING A KNOWLEDGE BASE REPRESENTATION

(71) Applicant: Adobe Inc., San Jose, CA (US)

(72) Inventors: Atanu Sinha, Bangalore (IN); Prakhar Gupta, Pittsburgh, PA (US); Manoj Kilaru, Bengalaru (IN); Madhav Goel, Mumbai (IN); Deepanshu Bansal, Rohtak (IN); Deepali Jain, Mumbai (IN); Aniket Raj, East Champaran (IN)

(73) Assignee: ADOBE INC., San Jose, CA (US)

( * ) Notice: Subject to any disclaimer, the term of this patent is extended or adjusted under 35 U.S.C. 154(b) by 1076 days.

(21) Appl. No.: 16/389,628

(22) Filed: Apr. 19, 2019

(65) Prior Publication Data
US 2020/0334545 A1 Oct. 22, 2020

(51) Int. Cl.
*G06N 5/02* (2023.01)
*G06F 16/2457* (2019.01)
*G06Q 30/0204* (2023.01)
*G06F 16/901* (2019.01)
*G06N 3/049* (2023.01)
*G06N 5/043* (2023.01)

(52) U.S. Cl.
CPC ......... *G06N 5/02* (2013.01); *G06F 16/24578* (2019.01); *G06F 16/9024* (2019.01); *G06N 3/049* (2013.01); *G06N 5/043* (2013.01); *G06Q 30/0204* (2013.01)

(58) Field of Classification Search
CPC .......... G06N 5/02; G06N 3/049; G06N 5/043; G06N 3/006; G06N 3/0454; G06N 5/022; G06F 16/24578; G06F 16/9024; G06Q 30/0204
See application file for complete search history.

(56) References Cited

U.S. PATENT DOCUMENTS 9,098,492 B2 * 8/2015 Tunstall-Pedoe ..... G06F 40/279
9,576,007 B1 * 2/2017 Sivathanu ............... G06F 16/22
(Continued)

OTHER PUBLICATIONS

Bordes, Antoine, et al., "Translating Embeddings For Modeling Multi-Relational Data", In Advances in neural information processing systems, 2013, 9 pages.
(Continued)

*Primary Examiner* — Jorge A Casanova
(74) *Attorney, Agent, or Firm* — Kilpatrick Townsend & Stockton LLP (57) ABSTRACT

A method includes accessing a subject entity and a subject relation of a focal platform and accessing a knowledge graph representative of control performance data. Further, the method includes computing a set of ranked target entities that cause the subject entity based on the subject relation or are an effect of the subject entity based on the subject relation. Computing the set of ranked target entities is performed using relational hops from the subject entity within the knowledge graph performed using the subject relation and reward functions. The method also includes transmitting the set of ranked target entities to the focal platform. The set of ranked target entities is usable for modifying a user interface of an interactive computing environment provided by the focal platform.

20 Claims, 7 Drawing Sheets

(56) References Cited

U.S. PATENT DOCUMENTS

| | | | | |
|---|---|---|---|---|
| 2018/0189269 | A1* | 7/2018 | Quirk | G06F 40/295 |
| 2019/0005409 | A1* | 1/2019 | Doshi | G06Q 30/0631 |
| 2019/0278777 | A1* | 9/2019 | Malik | G06F 16/9024 |
| 2019/0325042 | A1* | 10/2019 | Yu | G06N 5/027 |
| 2019/0354544 | A1* | 11/2019 | Hertz | G06K 9/6259 |
| 2019/0362246 | A1* | 11/2019 | Lin | G06N 5/022 |
| 2020/0257730 | A1* | 8/2020 | Srinivas | G06N 5/022 |
| 2021/0042589 | A1* | 2/2021 | Tokarev Sela | G06N 5/02 |
| 2021/0342541 | A1* | 11/2021 | Taylor | G06N 5/022 |

OTHER PUBLICATIONS

Das, Rajarshi, et al. "Go For A Walk And Arrive At The Answer: Reasoning Over Paths In Knowledge Bases Using Reinforcement Learning", arXiv:1711.05851.v2, Dec. 2018, 18 pages.

Matt Gardner, et al., "Improving Learning And Inference In A Large Knowledge-Base Using Latent Syntactic Cues", EMNLP, Proceedings 2013 Conference on Empirical Methods Natural Language Processing, 2013, 6 pages.

Guu, Kelvin, et al., "Traversing Knowledge Graphs In Vector Space", CoRR, abs/1506.01094, 2015, Conference on Empirical Methods in Natural Language Processing,, Sep. 2015, 10 pages.

Nickel, Maximilian, et al., "A Three-Way Model For Collective Learning On Multi-Relational Data", ICML Proceedings 28$^{th}$ International Conference on International Conference on Machine Learning, vol. 11, Jun.-Jul. 2011, 8 pages.

Schoenmackers, Stefan, et al., "Scaling Textual Inference To The Web", In Proceedings of the Conference on Empirical Methods in Natural Language Processing, pp. 79-88. Association for Computational Linguistics, 2008, 10 pages.

Socher, Richard, et al., "Reasoning With Neural Tensor Networks For Knowledge Base Completion", In Advances in Neural Information Processing Systems, 2013, 10 pages.

Toutanova, Kristina, et al., "Representing Text For Joint Embedding Of Text And Knowledge Bases", In Proceedings of the 2015 Conference on Empirical Methods in Natural Language Processing, Association for Computational Linguistics, 2015, 11 pages.

Toutanova, Kristina, et al., Compositional Learning Of Embeddings For Relation Paths In Knowledge Base And Text, In Proceedings of the 54th Annual Meeting of the Association for Computational Linguistics (vol. 1: Long Papers), vol. 1, 2016, 11 pages.

Xiong, Wenhan, et al., "Deeppath: A Reinforcement Learning Method For Knowledge Graph Reasoning". CoRR, abs/1707.06690, 2017, arXiv:1707.06690v1, Jul. 20, 2017, 10 pages.

McAfee, R. Preston, et al., "Dynamic Pricing In The Airline Industry", Handbook on Economics and Information Systems, Ed: TJ Hendershott, Elsevier, 2006, 44 pages.

Berant, Jonathan, et al., "Semantic Parsing on Freebase from Question-Answer Pairs", EMNLP ,ACL. ISBN: 978-1-937284-97-8, Proceedings 2013 Conference Empirical Methods in Natural Processing, 2013, 12 pages.

Atuszek, Cynthia, et al., "A Joint Model Of Language And Perception For Grounded Attribute Learning", In Proceedings of the 29th International Conference on Machine Learning, ICML 2012, vol. 2, 2012 8 pages.

Speer, Robert, et al., "Representing General Relational Knowledge in ConceptNet 5", LREC, Proceedings Eighth International Conference Language Resources and Evaluation, May 2012, 8 pages.

Williams, Ronald J., "Simple Statistical Gradient-Following Algorithms For Connectionist Reinforcement Learning", Machine Learning vol. 8, Issue 3-4, May 1992, 28 pages.

* cited by examiner

FACILITATING CHANGES TO ONLINE COMPUTING ENVIRONMENT BY ASSESSING IMPACTS OF ACTIONS USING A KNOWLEDGE BASE REPRESENTATION

TECHNICAL FIELD

This disclosure relates generally to facilitating modifications to interactive computing environments based on an evaluation of factors that impact performance of the interactive computing environments. More specifically, but not by way of limitation, this disclosure relates to evaluating impacts of actions in an interactive computing environment with an assessment model that assesses how actions impact the interactive computing environment, and, in some cases, performing modifications to the evaluated interactive computing environment.

BACKGROUND

Interactive computing environments, such as web-based applications or other online software platforms, allow users to perform various computer-implemented functions through graphical interfaces. For instance, an interactive computing environment can provide functionalities such as allowing users to complete transactions in the computing environment, or post content, such as text, images, or videos, to graphical interfaces provided by the computing environment. The performance of the interactive computing environment can thus be measured by performance metrics such as the number of transactions completed using the computing environment or the number of items added to the graphical interfaces.

An intervention to the interactive computing environment, such as a change to the content of the graphical interfaces in the interactive computing environment, can impact users' behaviors in interacting with the computing environment and thus impact the performance of the computing environment. For example, new content added to the graphical interfaces might increase the number of transactions completed in the computing environment, whereas removing some important content from the computing environment might reduce the number of the transactions completed in the computing environment.

Understanding the impact of the interventions can help to determine the proper actions that can be taken to modify the interactive computing environment so that the performance of the interactive computing environment is improved. However, determining the impact of the intervention is often difficult for any person or system without significant experience in a particular field. Existing methods are insufficient to reliably evaluate effects of interventions due to reliance on a knowledge base developed and grown experientially.

SUMMARY

Certain embodiments involve evaluating an interactive computing environment with an assessment model that assesses how various causes and effects impact the interactive computing environment, and, in some cases, performing modifications to the evaluated interactive computing environment. For example, a method includes accessing a subject entity and a subject relation of a focal platform and accessing a knowledge graph representative of control performance data. Further, the method includes computing a set of ranked target entities that cause the subject entity based on the subject relation or are an effect of the subject entity based on the subject relation. Computing the set of ranked target entities is performed using relational hops from the subject entity within the knowledge graph performed using the subject relation and reward functions. The method also includes transmitting the set of ranked target entities to the focal platform. The set of ranked target entities is usable for modifying a user interface of an interactive computing environment provided by the focal platform.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve evaluating an interactive computing environment with an assessment model that assesses how various causes and effects impact the interactive computing environment, and, in some cases, performing modifications to the evaluated interactive computing environment. For instance, a performance evaluation system accesses focal performance data of a focal online platform, which tracks performance data of the evaluated interactive computing environment, and a knowledge graph representative of control performance data. The performance evaluation system determines, based on the performance data and the knowledge graph, one or more resulting target causes or effects (i.e., target entities) that either lead to or result from the performance data (i.e., subject entities) of the focal online platform. Further, the performance evaluation system also determines one or more paths associated with the resulting target causes or effects. A path can indicate relations and interim entities that also affect the performance data. The performance evaluation system transmits the target causes or effects and the paths to the focal platform for use in modifying how the focal platform provides an interactive computing environment to user devices (e.g., modifying a functionality or layout of a graphical interface of the interactive computing environment).

The following non-limiting example is provided to introduce certain embodiments. In this example, a performance evaluation system is included in or in communication with a focal online platform, which provides an interactive computing environment that is being evaluated. The performance evaluation system executes one or more algorithms that allow for enhancing the performance of the focal online platform based on the impact of the user interactions with the interactive computing environment. To accomplish this enhancement, the performance evaluation system accesses performance data from the focal online platform, where the performance data measures performance metrics of the focal online platform (e.g., a number of transactions performed on the focal online platform, a click-through rate on the focal online platform, total visits by the user to the focal online platform, etc.). The performance evaluation system records various features associated with the focal online platform (e.g., the number of searches performed on the focal online platform, user click-through history, etc.).

Continuing with this example, the performance evaluation system services queries involving subject entities using a knowledge graph. The subject entities include an effect indicated by the performance data of the focal online platform. For instance, the performance evaluation system receives a query identifying a subject entity (e.g., an effect indicated by the performance data of the focal online platform) and a subject relationship (e.g., a question regarding a cause of the subject entity). To service the query, the performance evaluation system selects a knowledge graph having control performance data, which provides qualitative insights that can be based on quantitative information, where interlinked paths between the causes and effects are detailed in the control performance data. This control performance data is extracted from resources (e.g., websites, textbooks, or other data sources) providing indications of known, but incomplete, data change causes and effects. The interlinked paths in the knowledge graph are used to infer a target entity, which represents a cause or effect of the queried subject entity.

For instance, upon receiving a query including a subject entity (e.g., "product_positioning") and a subject relationship (e.g., "canAchieve"), the knowledge graph uses the subject entity and the subject relationship to generate a target entity of "more_payment" and a target entity path to "more_payment" of "hasprerequisite/importanto/capableof" (i.e., the target entity is reachable through a three-hop path within the knowledge graph of (i) hasprerequisite, (ii) importanto, and (iii) capableof). That is, beginning with the subject entity of "product_positioning," the knowledge graph is trained to answer the subject relationship of "canAchieve." The subject entity is represented in the knowledge graph as a node, and a path is taken in the knowledge graph from the subject entity node along a relational link of "hasprerequisite" to an interim node. The path continues along relational links of "importantto" and "capableof" until the target entity of "more_payment" is reached in the knowledge graph. Further, a reward policy may influence the selection of knowledge graph paths from the subject entity to the target entity by maximizing reward potential at every hop between interim entities along the target entity path. Other target entities are generated in a similar manner using the knowledge graph, and the set of target entities and the target entity paths are scored using the reward policy such as providing a higher score if an end entity of a path is a correct target entity, when a correct sequence of relations are followed to achieve a target entity, or a combination thereof.

The performance evaluation system can provide the ranked target entities and target entity paths to the focal online platform, which allows for modifying a presentation of the interactive computing environment based on predicted actions of the subject entity in an interactive computing environment, estimated causes of actions by the subject entity in the interacting computing environment, or both. In one example, the content or layout of a user interface of the focal online platform can be modified to change a performance metric associated with predicted actions or causes. For example, the content or layout of a user interface may be changed to enhance product positioning because the target entity indicated that enhanced product positioning can lead to increases in payments (e.g., by increasing a number of transactions completed in the focal online platform). In another example, where the performance evaluation system receives a subject entity (e.g., low sales) with an antecedent looking relationship (e.g., caused by), the focal online platform can be adjusted to address the target entity or entities that resulted in the low sales subject entity.

As described herein, certain embodiments provide improvements to interactive computing environments by solving problems that are specific to online platforms. These improvements include more effectively configuring the functionality of an interactive computing environment based on accurate and precise evaluations of online platform performance that can impact the ability of user devices to interact with the online platforms in a desired manner. Evaluating the impact of such online platform performance within an interactive computing environment is uniquely difficult because online platform performance could significantly impact a user's online experience but would be difficult to assess in real time or through surveys upon completion of the user's online experience.

Because these subject-entity evaluation problems are specific to computing environments, embodiments described herein utilize automated models that are uniquely suited for assessing computing environments. For instance, a computing system automatically applies various rules of a particular type (e.g., various relationships between the knowledge graph and the focal online platform captured in one or more models) to clickstream data, transaction data, or other interaction data and thereby computes objective measurements of online experiences, sometimes in a real-time manner. The measurements are objective at least because a computing system applies these rules in an automated manner, rather than relying on subject memories and judgments. The objective measurements are usable for enhancing a computing environment by, for example, modifying interface elements or other interactive aspects of the environment. Accurate and precise evaluations of the impact of performance of an online platform can enable effective configuration of the interactive computing environment, thereby reducing future negative impacts on the online platform. Consequently, certain embodiments more effectively facilitate modifications to a computing environment that facilitates desired functionality, as compared to existing systems.

As used herein, the term "online platform" is used to refer to a software program, which when executed, provides an interactive computing environment having various interface elements with which user devices interact to achieve various goals. In this disclosure, the term "online platform" may also be used to refer to the interactive computing environment that the online platform provides. For example, clicking or otherwise interacting with one or more interface elements during a session causes the online platform to manipulate electronic content, perform transactions, or otherwise interact with electronic content that is accessible via the online platform.

As used herein, the term "performance metric" is used to refer to a metric used to quantitatively measure the performance of a focal online platform. Examples of performance metrics include, but are not limited to, a number of user visits to the focal online platform, a click-through rate for an interface element of a graphical interface, a number of transactions completed on the focal online platform, and so on.

As used herein, the term "performance data" is used to refer to data generated or recorded by an online platform that describes the performance of the online platform and the associated features. An example of performance data includes the performance metric measuring the number of transactions completed on the online platform, and data associated with the transactions, such as the number of visits to the online platform, the number of queries submitted to the online platform, the content shown in the user interface of the online platform that are related to the transactions, and so on.

As used herein, the term "focal online platform" is used to refer to an online platform that is analyzed and for which an online platform performance is determined.

As used herein, the term "intervention" is used to refer to a change to one or more aspects of the focal online platform, such as the appearance, the functionality, and/or the availability of the platform. For example, the intervention includes one or more changes to the content, layout, settings, or other aspects of a user interface provided by the focal online platform.

As used herein, the term "control performance data" is used to refer to a corpus of data that analyzes similar functionalities as the focal online platform but is not subject to the intervention. For example, the control performance data includes known entities and their relations with other entities.

As used herein, the term "knowledge graph" is used to refer to an interlinking graph of entities and relations generated from the control performance data. For example, the knowledge graph links entities and relationships provided from a data corpus of the control performance data.

As used herein, the term "assessment model" is used to refer to a model, or the program code that implements the model, for assessing performance data of a focal online platform subject to an intervention based on the relationship between the focal online platform and the control performance data. The assessment model also provides a diagnosis for poor performance (e.g., what causes the poor performance) of the focal online platform and provides an ability to suggest interventions that improve performance of the focal online platform.

Figure 1:
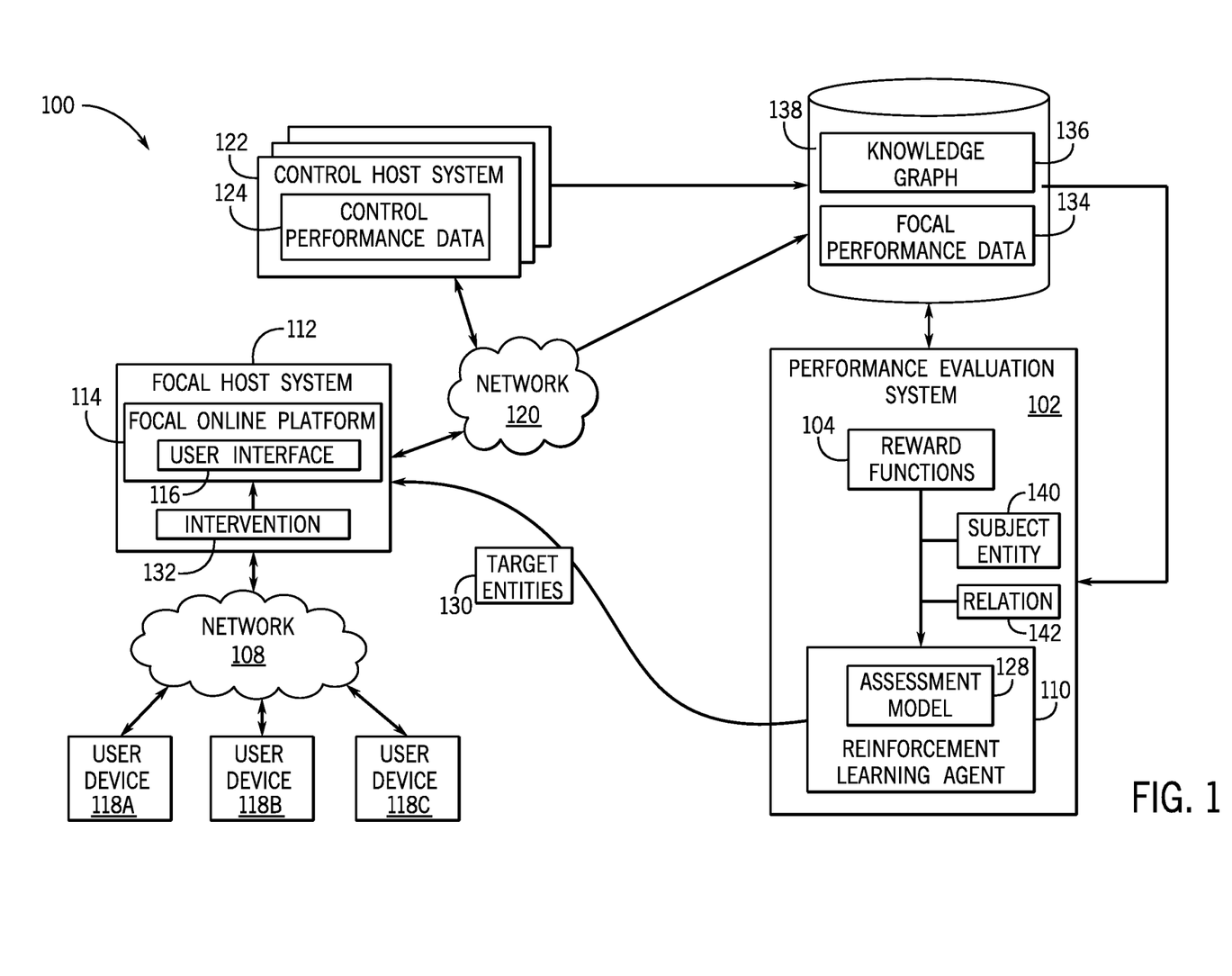
FIG. 1 depicts an example of a computing environment in which a performance evaluation system can be used to analyze performance of a focal online platform and facilitate modifications to the focal online platform, according to certain embodiments of the present disclosure.

Referring now to the drawings, FIG. 1 is an example of a computing environment 100 in which a performance evaluation system 102 can be used to analyze performance of a focal online platform 114 and, in some cases, facilitate modifications to the focal online platform 114. In various embodiments, the computing environment 100 includes the performance evaluation system 102, a focal host system 112 hosting the focal online platform 114, and control host systems 122 hosting control performance data 124.

Multiple user devices 118A-118C interact with the focal online platform 114, such as through a user interface 116 over a network 108. The network 108 may be a local-area network ("LAN"), a wide-area network ("WAN"), the Internet, or any other networking topology capable of connecting the user devices 118 to the focal host system 112. The interactions can include users clicking on interface elements in a user interface 116 of the focal online platform 114, users initiating transactions through the user interface 116, such as a purchase transaction or a registration transaction, or users creating contents on the user interface 116, such as posting a comment, an image, a blog, or any other content.

The interactions between the users or their associated user devices 118 and the focal online platform 114 are saved as focal performance data 134. The focal performance data 134 includes a performance metric measuring the performance of the focal online platform 114, such as the number of clicks on an interface element for a given period of time (e.g., in a minute, an hour, or a day), the number of transactions conducted within a given period of time, the number of new content items created by the users on the focal online platform 114, or other kinds of metrics. Other features associated with the focal online platform 114 during the interactions, such as the content displayed in the user interface 116, the number of user visits to the focal online platform 114, and the number of queries submitted to the focal online platform 114 when the transactions are conducted, can also be included in the focal performance data 134. While the focal performance data 134 is described herein resulting from performance of the focal online platform 114 with which a user is able to interact, the focal performance data 134 may also be any number of offline systems. For example, the focal performance data 134 can include performance data from a print or video marketing campaign, performance data associated with employee efficiency, or any other trackable data.

An intervention 132 might change the user interface 116 of the focal online platform 114 to alter interactions between the user devices 118 and the focal online platform 114. In an example, the intervention 132 is a proactive intervention that is introduced intentionally by an administrator or other individuals associated with the focal online platform 114, such as a change to the layout of the user interface 116, for example, to launch a campaign on the focal online platform 114. Changing the user interface layout might enhance performance of the focal online platform 114, thereby enhancing the focal performance data 134. The intervention 132 may also include changing the content of the user interface 116, such as adding or changing the content to provide an incentive for users to complete a transaction. For example, a displayed price associated with an item on the user interface 116 might be reduced. Offerings such as coupons, temporary price change, extra benefits, or special informational emails might be provided on or through the user interface 116. A focal online platform hosting a media site might change its user interface to offer a subscription at a lower price than usual or to provide access to its archive. In an example, these types of interventions 132 lead to an increase in the number of transactions completed through the focal online platform 114.

To determine the intervention 132 to apply to the focal online platform 114, the performance evaluation system 102 is employed to analyze the focal performance data 134 before application of the intervention 132 on the focal online platform 114. In addition, the performance evaluation system 102 examines the performance data hosted by one or more control host systems 122. The control performance data 124 is selected to include information with similar functionalities as the focal online platform 114 but not affected by the intervention 132. For example, the control performance data 124 may be data that is mined or otherwise extracted from marketing textbooks. The data extracted from the marketing textbooks may provide information about how different marketing entities are related. For example, an entity of an "increase in cost" has a relationship of "causes" with an additional entity of a "decrease in sales." The control performance data 124 may be generated from a number of sources such as textbooks, websites, or any other resource providing indications of relationships between entities. Because the control performance data 124 is not subject to the interventions 132, the data provided by the control performance data 124 can be used to adjust the interventions 132 of the focal host system 112 to provide enhancement to the functionality of the focal online platform 114. Further, in an example, the performance or other data obtained from the focal online platform 114 is used over time to inform the control performance data 124. For example, data in text books or other knowledge sources can be updated or supplemented by the performance or other data obtain from the focal online platform 114.

To perform the analysis, the focal performance data 134 is transmitted to the performance evaluation system 102 through a network 120 and stored at a datastore 138 associated with the performance evaluation system 102. The network 120 may be the same as, or different from, the network 108 and may also be a LAN, a WAN, the Internet, or any other networking topology that connects the focal host system 112 to the performance evaluation system 102. Similarly, the entities and the relationships identified in the control performance data 124 may be compiled and saved as a knowledge graph 136, which is transmitted over the network 120 and stored in the datastore 138. The knowledge graph 136 may be compiled and obtained directly from the control host systems 122 or from a third party data service. In an example, the knowledge graph 136 provides indications of how various entities interlink with one another through the relationships identified in the control performance data 124.

The performance evaluation system 102 employs a reinforcement learning agent 110 to build an assessment model 128 based on the relationship between the focal online platform 114 and the control performance data 124. In the assessment model 128, the reinforcement learning agent 110 provides reward functions 104 to paths and target entities of the knowledge graph 136 and models entity relationship paths from a subject entity 140 and a subject relation 142 originating from the focal performance data 134 of the focal online platform 114. The performance evaluation system 102 provides the reward functions 104 to the assessment model 128 based on, for example, a determined terminal entity (e.g., a target entity 130) of the knowledge graph 136, a relation path to the determined terminal entity of the knowledge graph 136, or a combination thereof. The performance evaluation system 102, through the assessment model 128, is able to provide a diagnosis for poor performance (e.g., what causes the poor performance) of the focal online platform and to provide suggested interventions that improve performance of the focal online platform 114.

Based on the reward functions 104, the subject entity 140, and the subject relation 142, the reinforcement learning agent 110 uses the assessment model 128 to generate a ranked set of target entities 130 for the focal online platform 114. The ranked set of target entities 130 may result in identification of interventions 132 that are most likely to have an effect on the focal performance data 134 based on the subject entity 140 and the subject relation 142 provided to the performance evaluation system 102.

The performance evaluation system 102 may transmit the ranked target entities 130 to the focal host system 112. In some embodiments, doing so causes the host system 112 to modify the focal online platform 114 to improve its performance. The focal host system 112 receives the ranked target entities 130 and controls one or more interventions 132 based on the ranked target entities 130 to impact the focal online platform 114. Based on the interventions 132, the user interface 116 is modified to enhance a desired positive impact on the focal online platform 114.

One or more computing devices are used to implement the performance evaluation system 102 and the focal host system 112. For instance, the performance evaluation system 102, the host system 112, or both could include a single computing device, a group of servers or other computing devices arranged in a distributed computing architecture, etc.

The online platform 114 can be any suitable online service for interactions with the user devices 118. Examples of an online platform include a content creation service, an electronic service for entering into transactions (e.g., searching for and purchasing products for sale, or registering for certain services), a query system, etc. In some embodiments, one or more host systems 112 are third-party systems that operate independently of the performance evaluation system 102 (e.g., being operated by different entities, accessible via different network domains, etc.). In additional or alternative embodiments, one or more host systems 112 include a performance evaluation system 102 as part of a common computing system. The user devices 118 may be any devices that are capable of accessing an online service. For non-limiting examples, the user devices 118 may be smartphones, smart wearables, laptop computers, desktop computers, or other types of user devices.

Figure 2:
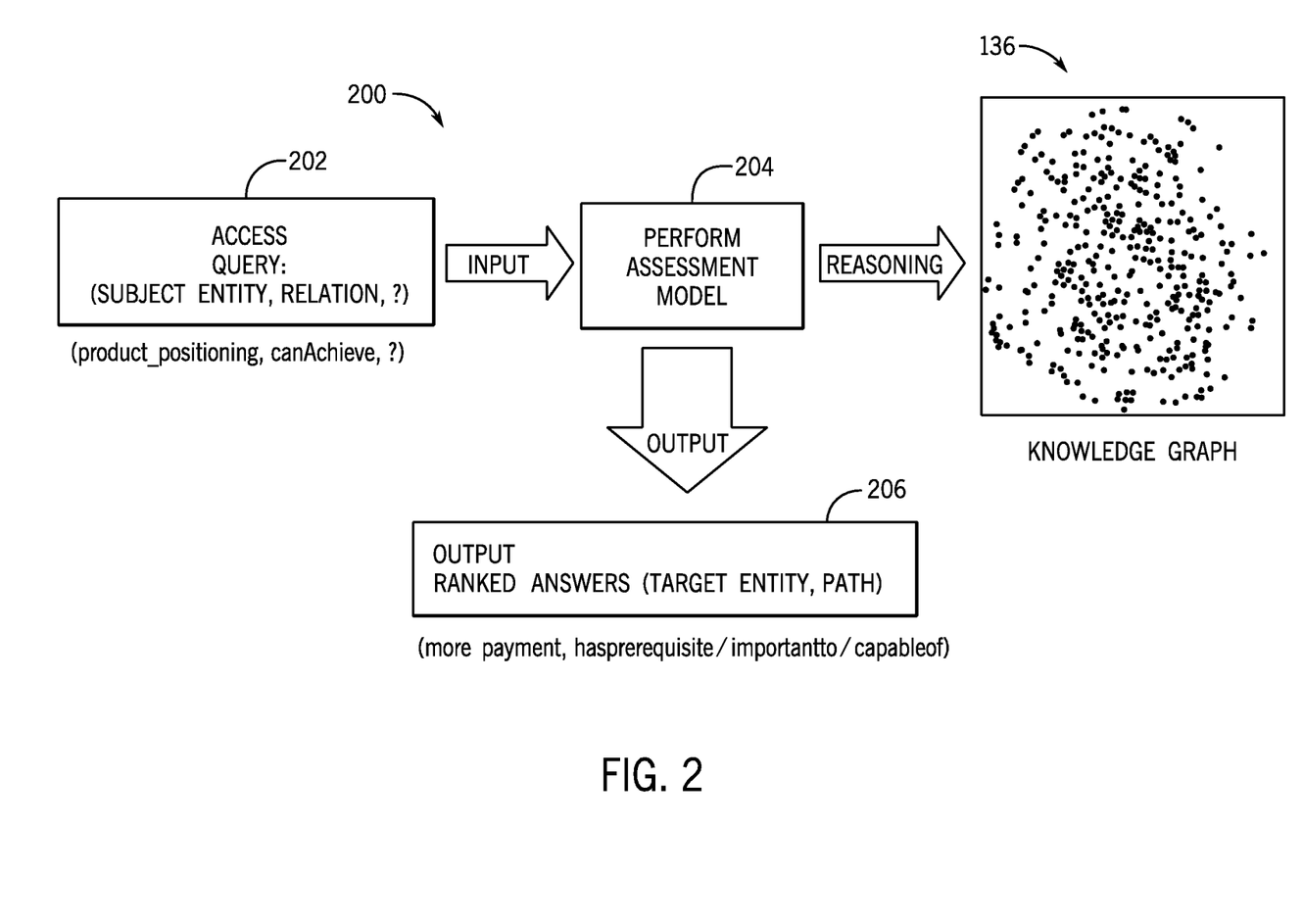
FIG. 2 depicts an example of a process for generating a ranked answer to a query using an assessment model, according to certain embodiments of the present disclosure.

FIG. 2 depicts an example of a process 200 for generating a ranked answer to a query using the assessment model 128. One or more computing devices (e.g., the computing environment 100) implement operations depicted in FIG. 2 by executing suitable program code. For illustrative purposes, the process 200 is described with reference to certain examples depicted in the figures. Other implementations, however, are possible.

At block 202, the process 200 involves accessing a query, which represents a portion of the focal performance data 134. For instance, the query accessed at block 202 includes an indication of a subject entity and a relation. The subject entity can reflect either a performance metric of the focal online platform 134 (e.g., low_sales), or the subject entity can reflect a cause of a performance metric of the focal online platform 134 (e.g., product_positioning). The relation included in the query is a relation to the subject entity that leads to the target entity 130. For example, a subject entity of "product_positioning" and a relation of "canAchieve" leads to one or more target entities identified by the assessment model 128. In an example, the query is automatically generated by the performance evaluation system 102 when the performance evaluation system 102 detects performance data 134 outside of a desired performance envelope (e.g., when sales for a particular item are too low). In another example, the query is input manually into the performance evaluation system 102 when a user would like to improve functionality of the focal online platform 114 or other sales or marketing platform.

At block 204, the process 200 involves performing the assessment model 128. As discussed above with respect to FIG. 1, the query accessed at block 202 is analyzed by the assessment model 128 using the knowledge graph 136. The knowledge graph 136 represents a series of interlinked entities and relations. Using the knowledge graph 136 and the reward functions 104, the assessment model 128 is able to generate and rank target entities 130 that provide an accurate answer the query accessed at block 202.

At block 206, the process 200 involves outputting ranked answers to the query from the knowledge graph 136. In an example, the assessment model 128, relying on the control performance data 124 of the knowledge graph 136, analyzes the query and outputs all of the target entities 130 that correctly answer the query and are within a defined number of relational hops within the knowledge graph 136 from the subject entity 140. For example, if the assessment model 128 is looking for answers within three relational hops from the subject entity 140, all of the target entities 130 that answer the query within three relational hops (i.e., three (entity, relation, entity) linked data triplets within the knowledge graph 136) may be ranked and output at block 206. Additionally, in some examples, the ranked answers include paths that achieve the target entities. For example, when the subject entity of the query is "product_positioning" and the relation of the query is "canAchieve," one of the ranked answers includes a target entity of "more_payment" and a three-hop path of "hasprerequisite/importantto/capableof." The paths that achieve the target entities are provided as a reasoning for how the target entity is reached from the subject entity and the relation. During a reinforced learning operation, the paths are used to train the assessment model 128 to reach the correct target entities.

Figure 3:
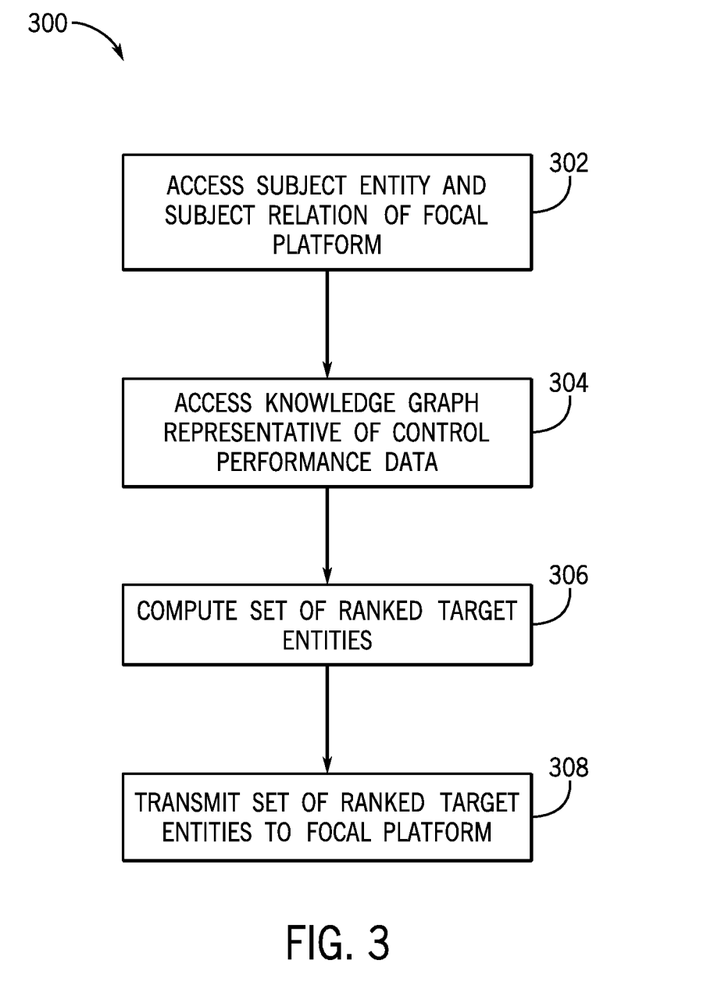
FIG. 3 depicts an example of a process for facilitating the modification of a focal online platform based on computing a set of ranked target entities and target entity paths, according to certain embodiments of the present disclosure.

FIG. 3 is an example of a process 300 for facilitating the modification of a focal online platform based on computing a set of ranked target entities and target entity paths. One or more computing devices (e.g., the computing environment 100) implement operations depicted in FIG. 3 by executing suitable program code. For illustrative purposes, the process 300 is described with reference to certain examples depicted in the figures. Other implementations, however, are possible.

At block 302, the process 300 involves accessing the subject entity 140 and the subject relation 142 (i.e., the query collectively) of the focal online platform 114. Interactions between user devices 118 and the focal online platform 114 generate the focal performance data 134. In an example, the focal performance data 134 may be analyzed to generate the subject entity 140 that is representative of one or more elements indicated in the focal performance data 134. The performance evaluation system 102 accesses the subject entity 140 from a suitable non-transitory computer-readable medium or other memory device, such as the datastore 138 associated with the performance evaluation system 102. In some embodiments, the focal performance data 134 is stored on one or more non-transitory computer-readable media within host system 112. The performance evaluation system 102 accesses the focal performance data 134 via suitable communications with a host system 112. In one or more examples, the subject entity 140 and the subject relation 142 are manually provided by a user to the performance evaluation system 102.

At block 304, the process 300 involves accessing the knowledge graph 136 that represents the control performance data 124. Similar to the focal performance data 134, the performance evaluation system 102 may access the knowledge graph 136 from the control performance data 124 via suitable communications with the control host systems 122. Alternatively, or additionally, the performance evaluation system 102 may access the knowledge graph 136 from the datastore 138 where the knowledge graph 136 is stored.

At block 306, the process 300 involves computing a set of ranked target entities 130. In an example, the target entity paths associated with the ranked target entities 130 are also computed at block 306. In some embodiments, the assessment model 128 locates the target entities 130 within the knowledge graph 136 that answer the query within the desired number of relational hops. The target entities 130 and the associated target paths are ranked based on the reward functions 104 applied by the performance evaluation system 102. In an example, the ranking indicates which of the set of target entities 130 impact the subject entity 140 the most when an intervention 132 directed at the target entity 130 is implemented at the focal online platform 114. The target entities 130 are ranked based on a probability of reaching the specific target entities 130 from the subject entity 140 and the subject relation 142.

At block 308, the process 300 involves transmitting the set of ranked target entities 130 to the focal host system 112 so that modification can be made to the focal online platform 114. In some embodiments, the ranked target entities 130 may be transmitted to a management system configured to manage and configure the focal online platform 114. Based on the one or more of the ranked target entities 130, the focal host system 112 or other systems control application of an intervention 132 associated with the ranked target entities 130. Based on effects provided by the intervention 132, the focal host system 112 or other systems associated with the focal online platform 114 is able to modify the focal online platform 114 to improve its performance.

For instance, the focal host system 112 includes one or more computing devices that can implement the intervention 132 to modify interface elements of the user interface 116 provided by the focal online platform 114, such as by changing the content, layout, or settings of the user interface 116. The focal online platform 114 may also be modified by the intervention 132 in any suitable manner including, but not limited to, the examples discussed above with respect to FIG. 1.

Figure 4:
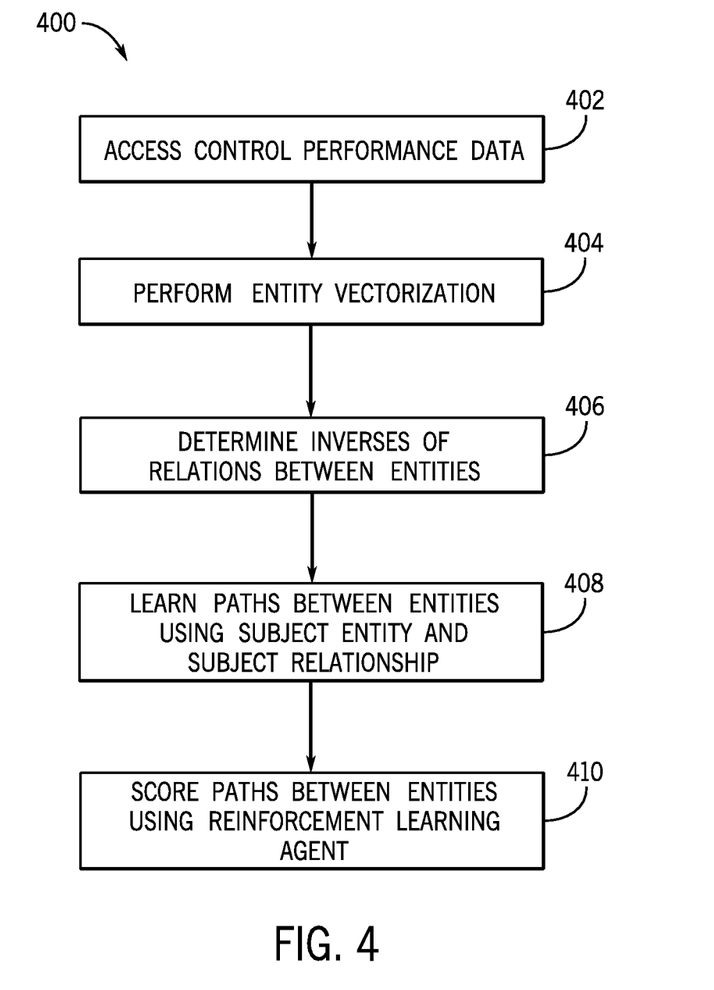
FIG. 4 depicts an example of process for generating a knowledge graph, according to certain embodiments of the present disclosure.

FIG. 4 depicts an example of a process 400 for generating the knowledge graph 136, according to certain embodiments of the present disclosure. The process 400 can be used to implement block 204 of the process 200. One or more computing devices (e.g., the computing environment 100) implement operations depicted in FIG. 4 by executing suitable program code (e.g., the performance evaluation system 102). For illustrative purposes, the process 400 is described with reference to certain examples depicted in the figures. Other implementations, however, are possible.

At block 402, the process 400 involves accessing the control performance data 124. The control performance data 124 includes a knowledge base obtained from a data source, such as from textbooks, websites, or any other resource providing indications of relations between entities. The knowledge base may be generated from the data source in the format of a triplet. In an example, a triplet refers to two entities that are connected by a relation. In such an example, the triplet is stored in the knowledge base of the control performance data 124 in the form ($e_1$, r, $e_2$), where $e_1$ and $e_2$ are elements of a set of entities of the knowledge base and r is a relation element (i.e., a linking relation) of a set of relations of the knowledge base that relates the two elements.

As described with respect to FIG. 1, the triplets pertain to marketing topics like product life cycle, product positioning, and market segmentation. These specific marketing topics are provided as examples, but are in no way limiting on what marketing topics can be associated with the triplets. In general, the triplets are extracted from a complex sentence within the data source of the control performance data 124 relevant to a marketing topic, and the triplets are distilled down to a semantically simpler format that maintains the meaning of the original complex sentence. As an example, the sentence, "Segmentation is a useful marketing decision when the consumer preferences in a geographical area or region are heterogeneous," is distilled into the triplet (heterogeneous preference, CausesDesire, segmentation). Similar triplets may be distilled from a corpus of data provided by the control performance data 124. In some examples, the relation component of the triplet may be selected from a set of available relationships that is most similar to the relationship described in the source sentence.

At block 404, the process 400 involves performing entity and relation vectorization on the entities and relations of the triplets. Instead of performing one-hot vectorization on the entities and relations of the triplets, the entities and relations are vectorized using a long short-term memory (LSTM) embedding tool. For example, the words representing an entity (e.g., heterogeneous preference) is fed into the LSTM embedding tool where the entities are assigned a vector (e.g., heterogeneous_preference) that includes a value that is similar to vector values of other similarly defined entities. The same process is performed with the relations of the triplets. The embeddings may be based on a global vectors for word representation model (e.g., a GloVe model), a trained GloVe model based on the data source of the control performance data 124, or a combination thereof.

At block 406, the process 400 involves determining inverses of the relations between the entities. For example, the performance evaluation system 102 generates an inverse triplet for each of the triplets identified in the control performance data 124. The inverse triplet is represented as $(e_2, r^{-1}, e_1)$. Using the example triplet from block 402, the inverse triplet may be represented as (segmentation, ResultsFrom, heterogeneous preference). The inverse triplets provide paths within the knowledge graph 136 for antecedent relationship paths to be analyzed. That is, the inverse triplets enable answering a query looking for why the subject entity 140 occurred rather than what will result from the subject entity 140 when provided to the assessment model 128. In an example, the inverse relations are also vectorized using the LSTM embedding tool.

At block 408, the process 400 involves learning paths between entities using the subject entity 140 and the subject relation 142. For example, each entity from the triplets identified in the control performance data 124 generates a node of the knowledge graph 136, and each relation from the triplets identified in the control performance data 124 generates an edge that links two of the entities. Additionally, the knowledge graph 136 interlinks triplets based on common entities located within the triplets identified in the control performance data 124. Because the knowledge base from the control performance data 124 is incomplete (e.g., the answer to every query is not directly represented), the paths between entities may provide the assessment model 128 with the ability to infer answers (e.g., the target entities 130) from the knowledge graph 136. For example, the path from the subject entity 140 to the target entity 130 may travers multiple relational hops (e.g., triplets) before the path reaches the target entity 130.

At block 410, the process 400 involves scoring the paths between entities using the reinforcement learning agent 110 of the performance evaluation system 102. In an example, scoring the paths between entities provides an indication of path efficiency for the path from the subject entity 140 to the target entity 130, and also provides an indication of relevancy of the target entity 130 to the subject entity 140. That is, it provides an indication of how much effect a change to the target entity 130 will have on the subject entity 140 or how much effect a change to the subject entity 140 will have on the target entity 130.

The query being assessed over the knowledge graph 136 by the assessment model 128 is a finite horizon sequential decision making problem. The reinforcement learning agent 110 is used at block 410 to help solve the decision making problem. Starting with a query in the form $(e_{1q}, r_q, ?)$, the reinforcement learning agent 110 learns to traverse the knowledge graph 136 to retrieve the answer, $e_{2q}$. For example, during implementation, the knowledge graph 136 is unrolled up to a fixed number of time steps. At each step from a current location (e.g., a current entity) within the knowledge graph 136, the reinforcement learning agent 110 is able to take an action in an attempt to advance toward the answer to the query, $e_{2q}$. In an example, the action taken by the reinforcement learning agent 110 is a relation that extends as an edge from the current entity and links the current entity with a subsequent entity (e.g., either the target entity 130 or an intermediate entity along the path to the target entity 130). Selection of the action taken by the reinforcement learning agent 110 is based on the query and the relations traversed up to the current entity (i.e., the history).

The reinforcement learning agent 110 defines an environment of the knowledge graph 136. This environment is defined as a 5-tuple (S, O, A, δ, R), where S is the state Space, O is an observation function, A is a set of possible actions from the state Space S, δ is a transition function, and R is the reward functions 104. The state Space S encodes the query $(e_{1q}, r_q)$, the target entity $(e_{2q})$, and a current location of exploration $(e_t)$ within the knowledge graph 136 (i.e., a hop location within the knowledge graph 136 between the subject entity 140 and the target entity 130). The state is represented by the following equation:

$$s=(e_t, e_{1q}, r_q, e_{2q}) \qquad (1)$$

A complete state of the environment is not observable, but the current location of exploration may be observed without the answer. Formally, the observation function O is represented by the following equation:

$$O(s=(e_t, e_{1q}, r_q, e_{2q}))=(e_t, e_{1q}, r_q) \qquad (2)$$

The set of possible actions A from the state Space S includes all outgoing edges (i.e., relations) in the knowledge graph 136 from a vertex v (i.e., the current location of exploration $e_t$). Formally, the set of possible actions A is represented by the following equation:

$$A_s=\{(e_t, r, v) \in E: S=(e_t, e_{1q}, r_q, e_{2q}), r \in R, v \in V\} \cup \{(S, \emptyset, s)\} \qquad (3)$$

where Ø indicates that an available action is to remain at a current location $e_t$ by taking no action (i.e., NO OP). The set of possible actions A indicates that the reinforcement learning agent 110 has an option to select which outgoing edge from the current location $e_t$ should be taken on a path to the target entity 130. During implementation, the knowledge graph 136 is unrolled up to a fixed number of time steps T (e.g., relational hops). The NO OP element of the set of possible actions A provides the ability for no hop to be taken to another entity from the current location $e_t$ within the knowledge graph 136. This NO OP element may be beneficial when the reinforcement learning agent 110 reaches a correct answer at a time step t that is less than the fixed number of time steps T. Additionally, the addition of the inverse relations (e.g., at block 406) equips the reinforcement learning agent 110 with the ability to undo a wrong decision and return to a prior node at the next time step t.

In an example, the environment defined by the reinforcement learning agent 110 evolves deterministically by updating the state S to a new vertex (e.g., a new current location $e_t$) by traversing a selected edge (e.g., relation r) from the previous location $e_{t-1}$. The transition function δ associated with such an update is defined by the following equation:

$$\delta(S,A) = (v, e_{1q}, r_q, e_{2q}) \quad (4)$$

where S=($e_t$, $e_{1q}$, $r_q$, $e_{2q}$) and A=($e_t$, r, v). Further, the reward functions 104 may be provided when the target entity 130 is equal to $e_t$ in the final state, when a correct path is taken to the target entity 130, or both.

A policy network is employed to make decisions that choose an action from all of the available actions $A_s$ from a specific state S. In an example, the policy network is a randomized history-dependent policy network π equal to ($d_1, d_2, \ldots, d_{T-1}$) where $d_t$ is a probability distribution over all of the available actions $A_s$ at a time step t taking into account history $h_t$. The history $h_t$ represents a sequence of observations and actions taken up to time step t from the subject entity 140. In an example, the history $h_t$ is encoded as a continuous vector using a long short-term memory (LSTM) network. For example, the embedding vectors of the current entity $e_t$, as determined using the LSTM embedding tool at block 404, the relation $r_{t-1}$ chosen to reach the current entity $e_t$, and the history embedding $h_{t-1}$ from the previous step are all encoded by the LSTM network to generate the current history $h_t$. For example, the current history $h_t$ is represented by the following equation:

$$h_t = \text{LSTM}(h_{t-1}, [r_{t-1}; e_t]) \quad (5)$$

In an example, the policy network is a two-layer feedforward network with rectified linear unit (ReLU) nonlinearity. The policy network receives the current history $h_t$ and the embedding for the subject relation 142 (e.g., the query relation $r_q$) and outputs a probability distribution over the available actions $A_s$ from the current entity $e_t$. The distribution is represented by the following equation:

$$d_t = \text{softmax}(A_t(W_2\text{ReLU}(W_1[h_t; e_t; r_q]))) \quad (6)$$

where weights $W_1$ and $W_2$ are biases corresponding to a regression constant or intercept.

In an example, parameters of the policy network are updated during training. In such an example, the parameters are adjusted using a policy gradient based on a cross-entropy loss function and the reward functions 104. The changes to the parameters of the policy network are intended to maximize the expected rewards for a path originating from the current entity $e_t$. As discussed above, the expected rewards are based on achieving a correct target entity, following a correct path to the target entity, or a combination thereof. In an example, the parameters of the policy network include embedding size, hidden size, weight of the batch loss, a learning rate, a maximum number of actions, a combination thereof, or any other parameters capable of contributing to an increase in the expected rewards.

Examples of Knowledge Graph Operation

Figure 5:
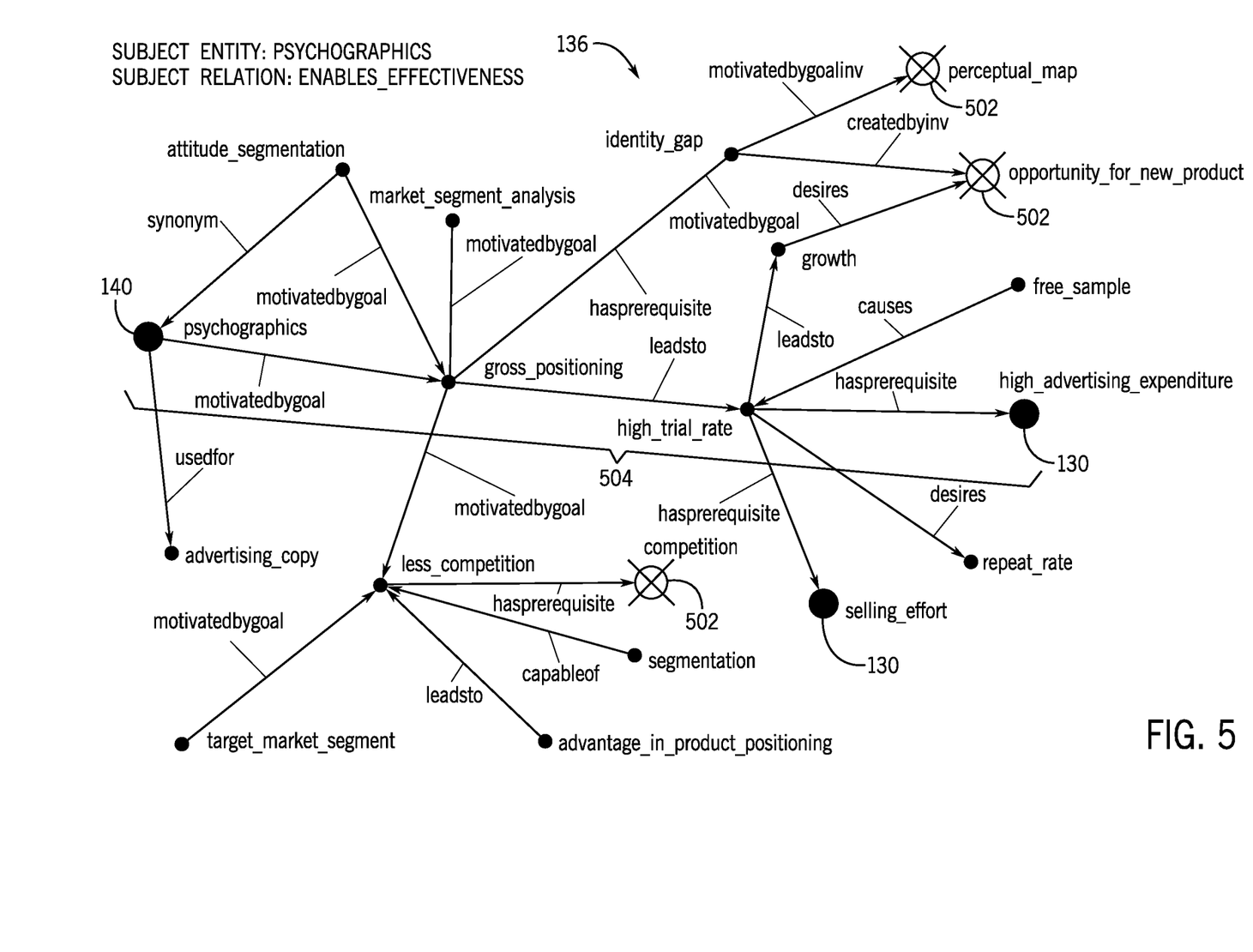
FIG. 5 depicts a visual representation of a knowledge graph in a forward relation orientation, according to certain embodiments of the present disclosure.

FIG. 5 is a visual representation of the knowledge graph 136 in a forward relation orientation. That is, a query (e.g., the subject entity 140 and the subject relation 142) provided to or otherwise accessed by the assessment model 128 is requesting information about what target entities 130 will be affected by changes to the subject entity 140 based on the subject relation 142 (e.g., consequences of the changes to the subject entity 140). As illustrated, the subject entity 140 is "psychographics" and the subject relation 142 is "enables_effectiveness." Thus, a query of (psychographics, enables_effectiveness, ?) requests target entities 130 of which psychographics can enable effectiveness.

The results of the query are provided in the knowledge graph 136 as the target entities 130 of "sell_effort" and "high_advertising_expenditure." That is, psychographics can be leveraged to enable the effectiveness of selling effort and high advertising expenditures. In contrast, the knowledge graph 136 may also identify entities 502 where psychographics are not leverageable to enable the effectiveness of the entities 502. For example, the entities 502 of "perceptual_map," "opportunity_for_new_product," and "competition" may all be accessible from the subject entity 140 along a relation path within a set number of actions (e.g., 3 relational hops in the illustrated figure), but none of these entities 502 have effectiveness enabled by leveraging psychographics.

In an example, the target entities 130 are output by the assessment model 128 as the ranked set of target entities 130. The ranking of the target entities 130 are determined based on how significantly changes to the subject entity 140 change the target entities 130. In one or more examples, the target entity 130 with a highest likelihood of being reached is included at the top of the ranked list. In one or more examples, the assessment model 128 also outputs a path 504 from the subject entity 140 to the target entity 130 to help understand how the subject entity 140 affects the target entity 130. Using the ranked set of target entities 130 output by the assessment model 128, the focal host system 112 is able to update or apply the interventions 132 to the focal online platform 114 to enhance a desired positive impact on the focal online platform 114.

Figure 6:
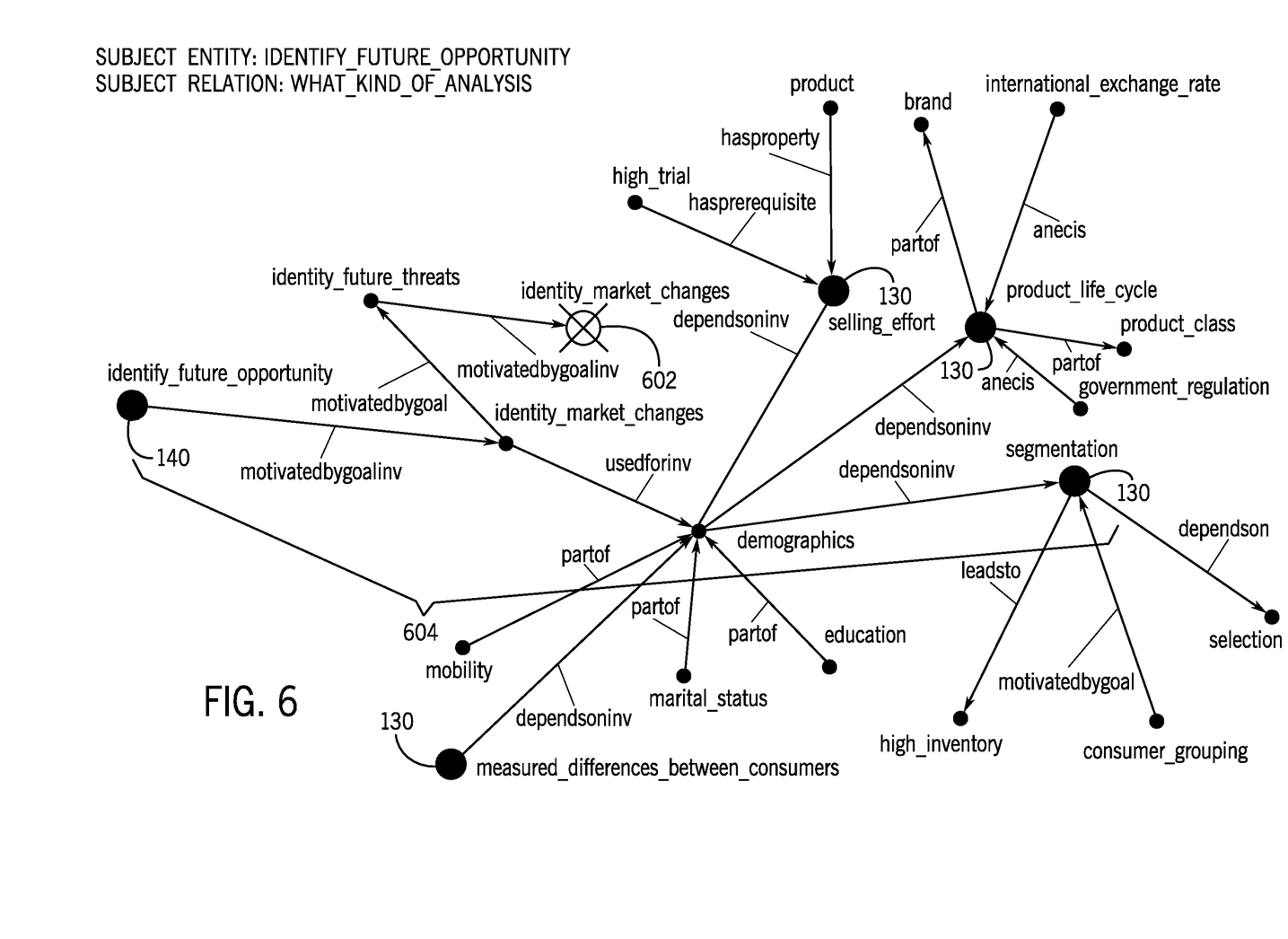
FIG. 6 depicts a visual representation of a knowledge graph in an antecedent relation orientation, according to certain embodiments of the present disclosure.

FIG. 6 is a visual representation of the knowledge graph 136 in an antecedent relation orientation. That is, a query (e.g., the subject entity 140 and the subject relation 142) provided to the assessment model 128 is requesting information about what target entities 130 have changes that affected the subject entity 140 based on the subject relation 142. The relations between the nodes of the knowledge graph 136 are represented as inverse relations because of the antecedent relation orientation. As illustrated, the subject entity 140 is "identify_future_opportunity" and the subject relation 142 is "what_kind_of_analysis." Thus, a query of (identify_future_opportunity, what_kind_of_analysis, ?) is requesting target entities 130 that provide analysis capable of identifying future opportunities.

The results of the query are provided in the knowledge graph 136 as the target entities 130 of "selling_effort," "product_life_cycle," "segmentation," and "measured_differences_between_consumers." That is, selling effort, a product life cycle, segmentation, and measured differences between consumers can all provide an analysis capable of identifying future opportunities. In contrast, the knowledge graph 136 may also identify entities 602 the do not provide an analysis capable of identifying future opportunities. For example, the entity 602 of "identify_market_changes" may be accessible from the subject entity 140 along a relation path within a set number of actions (e.g., 3 relational hops in the illustrated figure), but the entity 602 does not provide an analysis capable of identifying future opportunities. This determination is made through training of the assessment model 128. For example, ground truths are provided during training that have the "correct answers." Once trained, the assessment model 128 can incorporate these "correct answers" into the test data to determine that specific entities are incorrect (e.g., the entity 602).

In an example, the target entities 130 are output by the assessment model 128 as the ranked set of target entities 130. The ranking of the target entities 130 are determined based on how significantly changes to the target entities 130 change the subject entities 140. In one or more examples, the target entity 130 with a highest likelihood of changing the subject entities 140 is included at the top of the ranked list. In an example, the assessment model 128 also outputs a path 604 from the subject entity 140 to the target entity 130 to help understand how the subject entity 140 is affected by the target entity 130. Using the ranked set of target entities 130 output by the assessment model 128, the focal host system 112 is able to update or apply the interventions 132 to the focal online platform 114 to enhance a desired positive impact on the focal online platform 114.

While the knowledge graphs 136 depicted in FIGS. 5 and 6 depict examples of 3-hop answers to the query, other action numbers may be used to determine answers to the query. For example, the performance evaluation system 102 with sufficient memory and computational power may include answers resulting from 4 or more hops from the subject entity 140. In another example, the performance evaluation system 102 with limited memory and computational power may include answers resulting from 2 or fewer hops from the subject entity 140.

Example of a Computing System for Implementing Certain Embodiments

Figure 7:
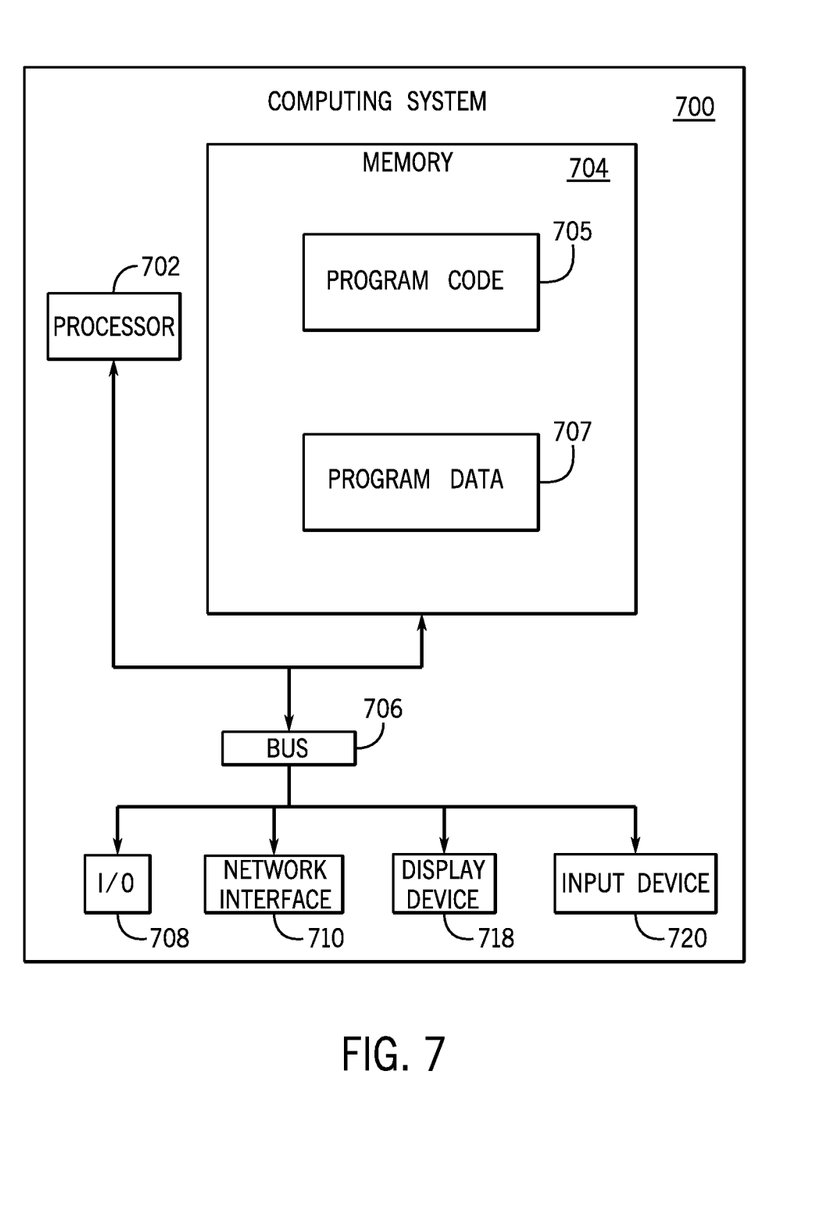
FIG. 7 depicts an example of a computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of a performance evaluation system 102, a focal host system 112, and a control host system 122. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 executes program code 705 that configures the processor 702 to perform one or more of the operations described herein. Examples of the program code 705 include, in various embodiments, the reward functions 104 and the reinforcement learning agent 110 by the performance evaluation system 102, the focal online platform 114, the control performance data 124 or other suitable applications that perform one or more operations described herein (e.g., one or more development applications for configuring the online platforms 114 or 122). The program code may be resident in the memory device 704 or any suitable computer-readable medium and may be executed by the processor 702 or any other suitable processor.

In some embodiments, one or more memory devices 704 stores program data 707 that includes one or more datasets and models described herein. Examples of these datasets include interaction data, performance data, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computing system 700. The buses 706 communicatively couples one or more components of a respective one of the computing system 700.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing a performance evaluation system 102) via a data network using the network interface device 710.

The computing system 700 may also include a number of external or internal devices, an input device 720, a presentation device 718, or other input or output devices. For example, the computing system 700 is shown with one or more input/output ("I/O") interfaces 708. An I/O interface 708 can receive input from input devices or provide output to output devices. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the performance evaluation system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
accessing a subject entity and a subject relation of a focal platform, wherein the subject entity is an effect indicated by performance data of the focal platform, and wherein the subject relation is a consequence of changes to the subject entity;
accessing a knowledge graph representative of control performance data indicating data change causes and results;
computing, using relational hops from the subject entity within the knowledge graph performed using the subject relation and reward functions, a set of ranked target entities that (i) cause the subject entity based on the subject relation or (ii) are a result of the subject entity based on the subject relation; and
transmitting the set of ranked target entities to the focal platform, wherein the set of ranked target entities is usable for modifying a user interface of an interactive computing environment provided by the focal platform.

2. The method of claim 1, wherein the knowledge graph comprises a plurality of interlinked data triplets, wherein each of the plurality of interlinked data triplets comprises a first object entity, a linking relation, and a second object entity.

3. The method of claim 1, wherein computing the set of ranked target entities comprises ordering target entity paths from the subject entity to the set of ranked target entities based on action probabilities along the target entity paths to the set of ranked target entities.

4. The method of claim 3, wherein the target entity paths comprise at least three interlinked triplets, and wherein each target entity of the set of ranked target entities comprises an object entity of a final interlinked triplet of the at least three interlinked triplets.

5. The method of claim 3, wherein the action probabilities are based on a terminal entity based reward and a path based reward of a reinforcement learning agent.

6. The method of claim 3, wherein the action probabilities are based on a long short-term memory encoded history of decisions.

7. The method of claim 1, wherein computing the set of ranked target entities comprises computing the set of ranked target entities that are antecedent to the subject entity.

8. The method of claim 7, wherein computing the set of ranked target entities further comprises computing an additional set of ranked target entities that are consequences of changes to the subject entity.

9. A computing system comprising:
means for accessing a subject entity and a subject relation of a focal platform, wherein the subject entity is an effect indicated by performance data of the focal platform, and wherein the subject relation is a consequence of changes to the subject entity;
means for accessing a knowledge graph representative of control performance data indicating data change causes and results;
means for computing, using relational hops from the subject entity within the knowledge graph performed using the subject relation and reward functions, a set of ranked target entities that (i) cause the subject entity based on the subject relation or (ii) are a result of the subject entity based on the subject relation; and
means for transmitting the set of ranked target entities to the focal platform, wherein the set of ranked target entities is usable for modifying a user interface of an interactive computing environment provided by the focal platform.

10. The computing system of claim 9, wherein the knowledge graph comprises a plurality of interlinked data triplets, wherein each of the plurality of interlinked data triplets comprises a first object entity, a linking relation, and a second object entity.

11. The computing system of claim 9, wherein the means for computing the set of ranked target entities comprises:
    means for ordering target entity paths from the subject entity to the set of ranked target entities based on action probabilities along the target entity paths to the set of ranked target entities.

12. The computing system of claim 11, wherein the target entity paths comprise at least three interlinked triplets, and wherein each target entity of the set of ranked target entities comprises an object entity of a final interlinked triplet of the at least three interlinked triplets.

13. The computing system of claim 11, wherein the action probabilities are based on a terminal entity based reward and a path based reward of a reinforcement learning agent.

14. The computing system of claim 9, wherein the means for computing the set of ranked target entities comprises computing the set of ranked target entities that are antecedent to the subject entity.

15. A non-transitory computer-readable medium having program code that is stored thereon, the program code executable by one or more processing devices for performing operations comprising:
    accessing a subject entity and a subject relation of a focal platform, wherein the subject entity is an effect indicated by performance data of the focal platform, and wherein the subject relation is a consequence of changes to the subject entity;
    accessing a knowledge graph representative of control performance data indicating data change causes and results;
    computing, using relational hops from the subject entity within the knowledge graph performed using the subject relation and reward functions, a set of ranked target entities that (i) cause the subject entity based on the subject relation or (ii) are a result of the subject entity based on the subject relation; and
    transmitting the set of ranked target entities to the focal platform, wherein the set of ranked target entities is usable for modifying a user interface of an interactive computing environment provided by the focal platform.

16. The non-transitory computer-readable medium of claim 15, wherein computing the set of ranked target entities comprises computing the set of ranked target entities that are antecedent to the subject entity.

17. The non-transitory computer-readable medium of claim 16, wherein computing the set of ranked target entities further comprises computing an additional set of ranked target entities that are consequences of changes to the subject entity.

18. The non-transitory computer-readable medium of claim 15, wherein the knowledge graph comprises a plurality of interlinked data triplets, wherein each of the plurality of interlinked data triplets comprises a first object entity, a linking relation, and a second object entity.

19. The non-transitory computer-readable medium of claim 15, wherein computing the set of ranked target entities comprises ordering target entity paths from the subject entity to the set of ranked target entities based on action probabilities along the target entity paths to the set of ranked target entities.

20. The non-transitory computer-readable medium of claim 19, wherein the target entity paths comprise at least three interlinked triplets, and wherein each target entity of the set of ranked target entities comprises an object entity of a final interlinked triplet of the at least three interlinked triplets.

* * * * *